United States Patent [19]
Brewer et al.

[11] Patent Number: 6,014,675
[45] Date of Patent: Jan. 11, 2000

[54] METHOD AND APPARATUS FOR FACILITATING PROGRESSIVE INCREASE IN ALLOWABLE MOUNT/DEMOUNTS DURING INVENTORY UPDATES

[75] Inventors: Vickie L. Brewer; Christine L. Fosler; Frank D. Gallo; Anthony A. Lambert, all of Tucson, Ariz.

[73] Assignee: International Business Machines Corporation, Armonk, N.Y.

[21] Appl. No.: 08/993,457

[22] Filed: Dec. 18, 1997

[51] Int. Cl.[7] ............................. G06F 12/00; G06F 13/14
[52] U.S. Cl. .......................... 707/204; 711/161; 711/162
[58] Field of Search ............................... 707/1, 204, 200; 711/117, 161, 162, 112

[56] References Cited

U.S. PATENT DOCUMENTS

| | | | |
|---|---|---|---|
| 5,059,772 | 10/1991 | Younglove | 235/383 |
| 5,325,523 | 6/1994 | Beglin et al. | 707/200 |
| 5,423,018 | 6/1995 | Dang et al. | 395/425 |
| 5,438,674 | 8/1995 | Keele et al. | 395/404 |
| 5,469,560 | 11/1995 | Beglin | 711/112 |
| 5,475,834 | 12/1995 | Anglin et al. | 707/203 |
| 5,530,850 | 6/1996 | Ford et al. | 707/206 |
| 5,546,315 | 8/1996 | Kleinschnitz | 364/478.06 |
| 5,778,391 | 7/1998 | Fisher et al. | 707/204 |
| 5,809,511 | 9/1998 | Peake | 707/204 |
| 5,883,864 | 3/1999 | Saliba | 369/30 |

*Primary Examiner*—Paul V. Kulik
*Attorney, Agent, or Firm*—Altera Law Group, LLC

[57] ABSTRACT

A method and apparatus is disclosed for managing inventory updates in a data library. The method and apparatus allows mount/demount activity to occur during an inventory update and allows a corresponding increase in the number of data storage media that are available for mount/demount during the inventory update. The invention initiates an inventory update for the data storage media library, scans data storage media in the data storage media library behind opened doors, identifies verified data storage media, receives a request for moving data storage media between the slots and the data storage drives, determines if the request is for verified data storage media and performs the request when the request is determined to be for verified data storage media. The request is requeued when the request is for unverified data storage media. Whether a frame containing data storage media has had a door to the frame opened is determined and the data storage media in a frame having had the door opened is designated as being unverified. Data storage media in a frame not having had the door opened is designated as being verified.

43 Claims, 4 Drawing Sheets

METHOD AND APPARATUS FOR FACILITATING PROGRESSIVE INCREASE IN ALLOWABLE MOUNT/DEMOUNTS DURING INVENTORY UPDATES

BACKGROUND OF THE INVENTION

1. Field of the Invention

This invention relates in general to data storage and processing, and more particularly to the management of inventory updates in a data library.

2. Description of Related Art

The implementation of new technology in magnetic tape products has meant that the density of data written to tape has increased by orders of magnitude in the last ten or fifteen years. The ability to record high density tapes, e.g., ten gigabytes or more on one physical volume, has led to reducing costs in physical tape hardware as well as in handling and management resources.

However, over the past five years, tape data set stacking products, i.e., software solutions to increase tape utilization, have evolved in response to the customer requirement for more efficient ways to manage the information stored on tape. Often a tape library system is provided in conjunction with a library manger. For example, a virtual tape server (VTS) having a tape library has been proposed to achieve increased capacity. In a VTS, the hardware is transparent to the host and the user. The VTS requires little external management except though the library management element of the tape library into which a VTS is integrated.

In a hierarchical storage systems, such as a VTS, intensively used and frequently accessed data is stored in fast but expensive memory. One example of a fast memory is a direct access storage device (DASD). In contrast, less frequently accessed data is stored in less expensive but slower memory. Examples of slower memory are tape drives and disk drive arrays. The goal of the hierarchy is to obtain moderately priced, high-capacity storage while maintaining high-speed access to the stored information.

In the VTS system, a host data interface, a DASD, and a number of tape devices are provided. When the host writes a logical volume, or a file, to the VTS, the data is stored as a file on the DASD. Although the DASD provides quick access to this data, it will eventually reach full capacity and a backup or secondary storage system will be needed. An IBM 3590tape cartridge is one example of a tape device that could be used as a backup or secondary storage system.

When the DASD fills to a predetermined threshold, the logical volume data for a selected logical volume, typically the oldest, is removed from the DASD to free space for more logical volumes. The selected DASD file is then appended onto a tape cartridge, or a physical volume, with the original left on the DASD for possible cache hits. When a DASD file has been appended to a tape cartridge and the original remains on the DASD, the file is "premigrated".

When the host reads a logical volume from the VTS, a cache hit occurs if the logical volume currently resides on the DASD. If the logical volume is not on the DASD, the storage manager determines which of the physical tape volumes contains the logical volume. The corresponding physical volume is then mounted on one of the tape devices, and the data for the logical volume is transferred back to the DASD from the tape.

Tape servers may use an engine to move data between the DASD and tape drives in a virtual tape server (VTS) environment. For example, the IBM Virt Tape Server (VTS) uses the IBM Adstar Distributed Storage Manager (ADSM) as its engine to move data between the DASD and IBM 3590 tape drives on the VTS. In such a system, the VTS uses the a storage manager client on the DASD, e.g., the ADSM Hierarchical Storage Manager (HSM) client, and a distributed storage manager server attached to the tape drives to provide this function. Host systems can also identify volume serial numbers with a category. Then the host systems can request that an entire category be mounted rather than a specific volume serial number. The host will indicate sequential or random order for the mounts.

A tape library dataserver provides automated tape storage for multiple applications such as mid-range computer facilities, LAN servers and archiving applications. To provide high frequency to data, high storage capacity and high performance must be combined. Therefore, knowing the location of data storage media in the tape library is paramount. Typically, the data storage media are bar-coded with a serial number or other identifying marking. Thus, an accessor that is equipped with a bar-code reader can access any cartridge in the library. In addition, the accessor can mount any cartridge located in the library on any library drive. The accessor's management feature permits rapid scanning of all tape cartridge bar-codes.

One function of a tape library dataserver is to provide an update of the locations of data storage media in that library upon resumption of automated operations after the library has been paused and had at least one door opened. Since, while paused, the operator can open any number of doors and move data storage media within the frames of these opened doors, a scan operation must occur to determine which, if any, data storage media have been added, removed, or moved within such frames. Since the location of data storage media within such a library are not known with certainty, any host requests to mount or demount data storage media are held until an inventory update procedure has completed.

However, the inventory update procedure is a time consuming process that currently holds all mount/demount activity in the library while it's in process. Further, the time increases as the length of the library increases. For example, a sixteen frame library takes well over an hour if all doors are being inventoried.

It can be seen that there is a need for a method and apparatus that allows mount/demount activity to occur during an inventory update.

It can also be seen that there is a need for a method and apparatus that allows a corresponding increase in the number of data storage media that are available for mount/demount during the inventory update.

SUMMARY OF THE INVENTION

To overcome the limitations in the prior art described above, and to overcome other limitations that will become apparent upon reading and understanding the present specification, the present invention discloses a method and apparatus for managing inventory updates in a data library.

The present invention solves the above-described problems by providing a method and apparatus that allows mount/demount activity to occur during an inventory update and that allows a corresponding increase in the number of data storage media that are available for mount/demount during the inventory update.

A method in accordance with the principles of the present invention includes the steps of initiating an inventory update for a data storage media library, scanning data storage media in the data storage media library, identifying verified data storage media, receiving a request for moving data storage media between a rack and data storage media drives, determining if the request is for verified data storage media and performing the request when the request is determined to be for verified data storage media Other embodiments of a system in accordance with the principles of the invention may include alternative or optional additional aspects. One such aspect of the present invention is that the request is requeued when the request is for unverified data storage media Another aspect of the present invention is that the step of identifying verified data storage media further comprises the step of determining whether a frame containing data storage media has had a door to the frame opened and designating the data storage media in a frame having had the door opened as being unverified.

Another aspect of the present invention is that the step of identifying verified data storage media further comprises the step of determining whether a frame containing data storage media has had a door to the frame opened and designating the data storage media in a frame not having had the door opened as being verified.

The invention also includes a data storage media dataserver. The data storage media dataserver includes a data storage media library including data storage media, data storage drives, an accessor for accessing accesses the data storage media from storage slots in the data storage media library and delivering the accessed media to the data storage drives, and a library manager. The library manager initiates an inventory update for the data storage media library, scans data storage media in the data storage media library, identifies verified data storage media, receives a request for moving data storage media between the slots and the data storage drives, determines if the request is for verified data storage media and performs the request when the request is determined to be for verified data storage media.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus that allows mount/demount activity to occur during an inventory update and that allows a corresponding increase in the number of data storage media that are available for mount/demount during the inventory update.

Figure 1:
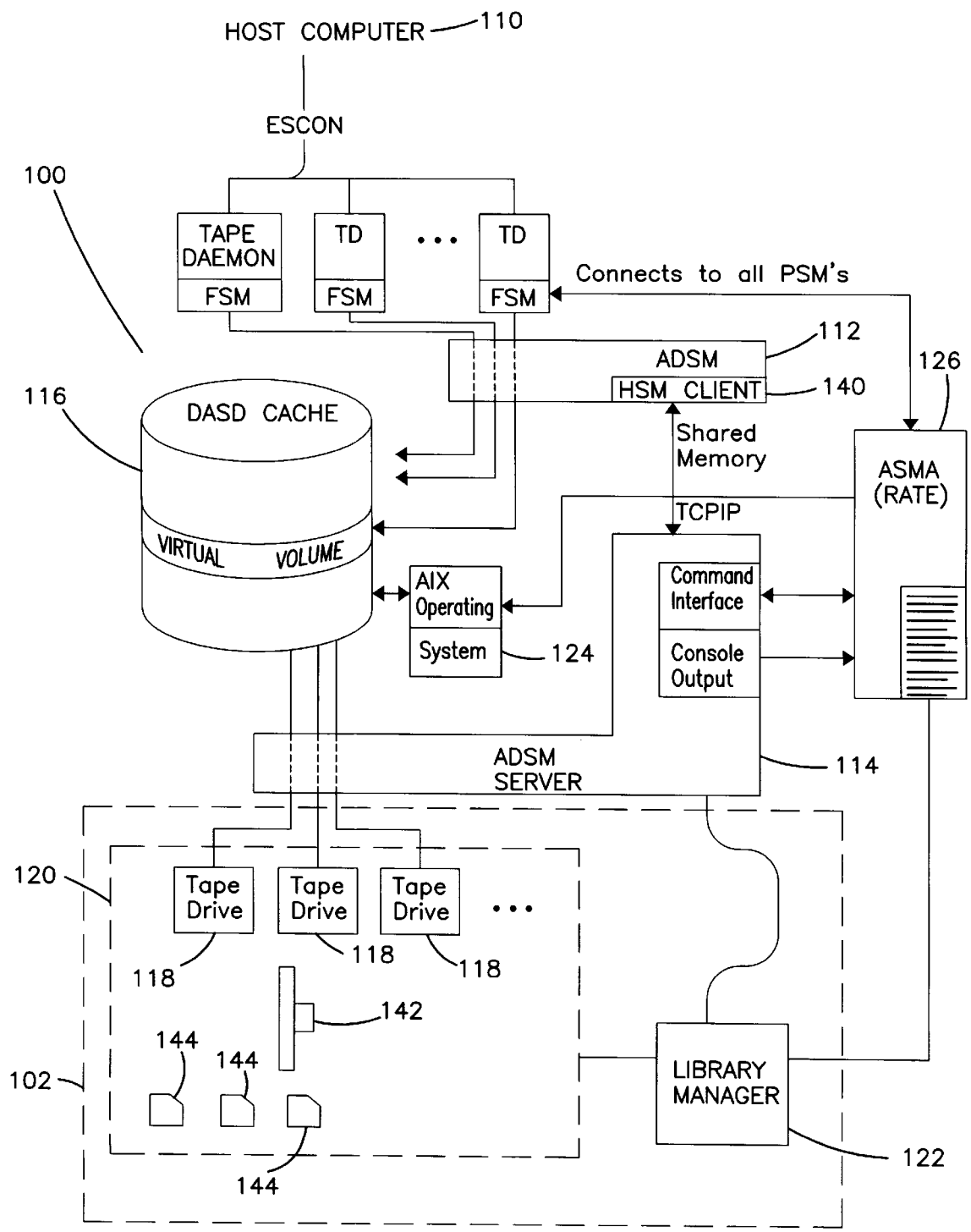
FIG. 1 illustrates a virtual tape server system having a tape library dataserver according to the present invention.

FIG. 1 illustrates a virtual tape server system 100 which may include a tape library dataserver 102 according to the present invention. Those skilled in the art will recognize that the invention is not meant to be limited to a virtual tape server environment, but may be utilized in data library system.

The virtual tape server 100 includes a host computer 110, a distributed storage manager 112, an distributed storage manager server 114, and DASD cache 116. The tape library data server 102 includes a plurality of tape drives 118 forming an automated library 120 and a library manager 122. The virtual tape server 100 also includes an operating system 124 and an automatic storage manager administrator 126 (BATE).

In the VTS 100, intensively used and frequently accessed data is stored in fast but expensive memory, such as direct access storage devices (DASD) 116. In contrast, less frequently accessed data is stored in less expensive but slower memory, such as tape drives 118.

A VTS 100 uses an engine 112 to move data between the DASD 116 and tape drives 118. For example, the IBM Virtual Tape Server (VTS) uses the IBM Adstar Distributed Storage Manager (ADSM) as its engine to move data between the DASD and IBM 3590 tape drives on the VTS. In such a system, the VTS 100 uses the a storage manager client 140, e.g., the ADSM Hierarchical Storage Manager (HSM) client, and a distributed storage manager server 114 attached to the tape drives 118 to provide this function. The library manager 122, via commands from the distributed storage manager server 114, controls an accessor 142 which accesses individual tapes 144.

The distributed storage manager 112 is a client/server hierarchical storage manager 112 that may be used for a broad range of applications. As such, the distributed storage manager 112 often has a downlevel list of which files have a recent copy on one of the tapes 144. Further, the automatic storage manager administrator 126 is provided to link all the VTS code components and external links, e.g., to the library manager 122 and the tapes drives 118.

Figure 2:
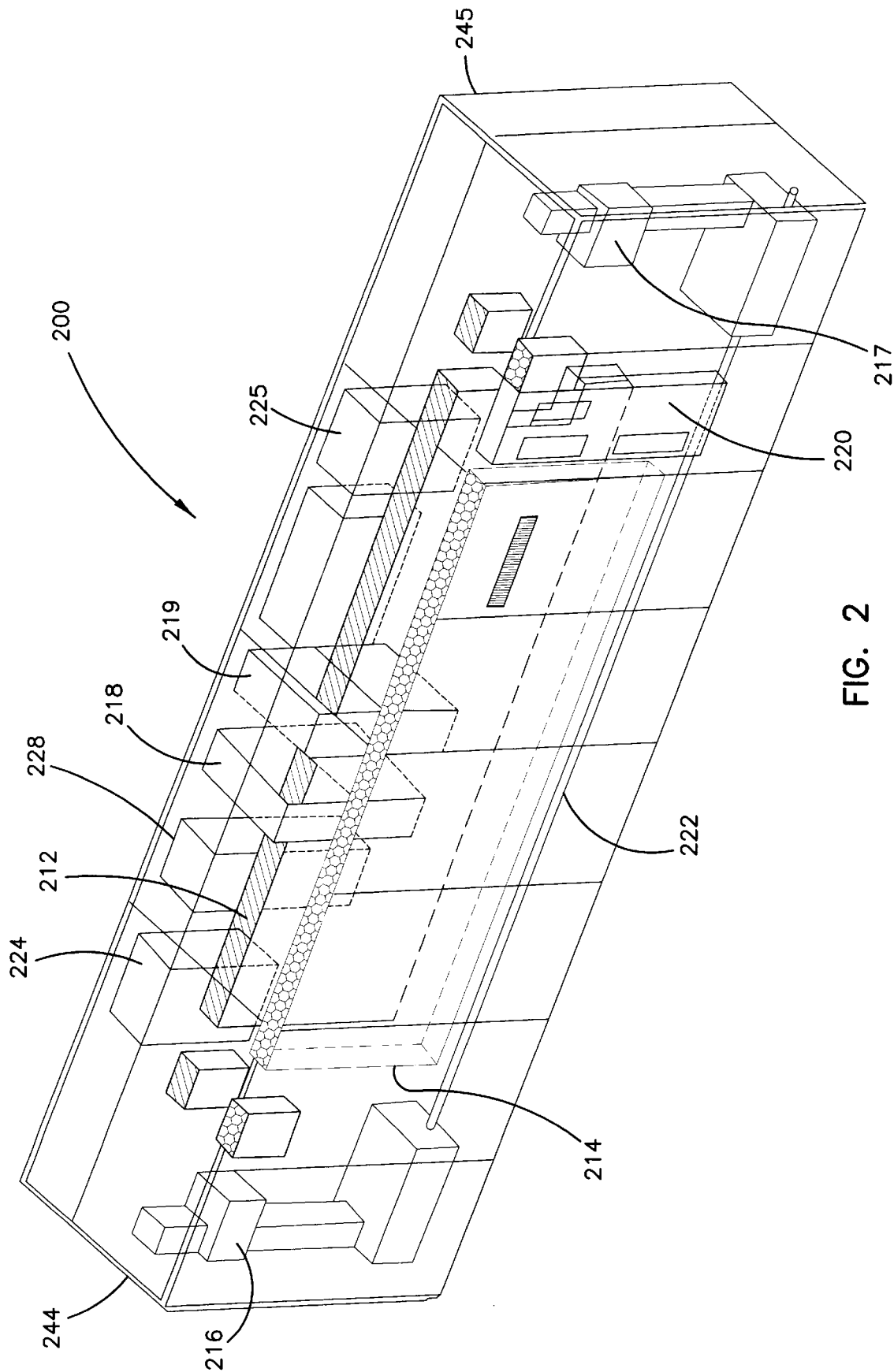
FIG. 2 illustrates an automated data storage library.

FIG. 2 illustrates an automated data storage library 200 having an inner "wall" of storage slots 212 and an outer wall of storage slots 214, which store data storage media. Typically, the data storage media are self-contained within a portable container, or cartridge. Examples of such data storage media include magnetic tape cartridges or cassettes, optical disk cartridges of various types, including ROM, WORM and rewritable, and in various formats. For universal reference to any of these types of media, the terms "data storage media" or "media" are used herein.

In addition, the library of the present invention may be a multi-accessor library as illustrated in FIG. 2 having at least two accessors 216 and 217. An accessor is a robotic device which accesses the data storage media from the storage slots and delivers the accessed media to data storage drives 218 and 219 for reading and/or writing data on the accessed media and returns the media to storage slots 212 and 214. A media import/export port or station, 220 is provided for insertion or retrieval of data storage media into or out of the library. The accessors 216 and 217 run on a rail 222 in an aisle between the inner wall of storage slots 212 and the outer wall of storage slots 214.

In the illustrated embodiment, multiple library managers 224 and 225 are provided to manage the positioning and access of the accessors 216 and 217 to transport data storage media between storage slots 212 and 214, import/export port 220 and data storage drives 218 and 219.

An operator input station 228 is provided for allowing an operator to communicate with the automated data storage library. The accessors run on the rails 222 along the library aisle by motors (not shown). An example of an automated data storage library 210 is the IBM 3494 Data Storage Library, which stores magnetic tape cartridges.

Typically, the library manager 224 or 225 comprises a data processor and suitable data memory and data storage capability to control the operation of the library 210. Specifically, the library manager 224 or 225 controls the actions of the robot accessors 216 and 217. The conventional library manager 224 or 225 is interconnected through a provided interface to a host processor (not shown), which provides commands requesting access to particular data storage media or to media in particular storage slots, commands for access to data or to locations on the data storage media and information to be recorded on, or to be read from. Selected data storage media are typically transmitted directly between the drives 218, 219 and the host. The library manager 224 or 225 is typically provided with a database, which includes tables and programs. Examples of library managers 224 and 225 are an IBM personal computer or IBM RS/6000 processor.

Library manager 224 is associated with accessor 216 and library manager 225 is associated with accessor 217. The library manager 224 and associated accessor 216 may be located at one end of the library aisle and designated the "A" library manager and "A" accessor. Similarly, the library manager 225 and associated accessor 217 are at the opposite end of the library aisle and designated the "B" library manager and "B" accessor. The accessor 216 is called the "local" accessor with respect to library manager 224. The accessor 217 is called the "remote" accessor with respect to library manager 224. Similarly, accessor 217 is called the "local" accessor and accessor 216 is called the "remote" accessor with respect to library manager 225.

The present invention may be utilized with a single library manager, or with the illustrated multiple library managers. In accordance with the present invention, one of the accessors is designated as the "active" accessor. In one embodiment, only the active accessor has authorization to be in the aisle and handles all of the operations of the library. This sole authorization may also be called "full aisle mode". In a dual accessor library, in full aisle mode the accessor that is not servicing aisle requests, is the "standby" accessor. If the standby accessor is capable of performing the functions of an active accessor, it is considered to be available in "hot standby mode". If the standby accessor is not capable of performing the functions of an active accessor, it is considered to be "unavailable". In FIG. 2, the standby assessor is moved to the end of the library 244 or 245 and out of the aisle. The ends 244 and 245 of the library are called "service" or "standby" areas.

One function of the tape library dataserver 200 is to provide an update of the locations of data storage media in that library upon resumption of automated operations after the library has been paused and had at least one door opened. Since, while paused, the operator can open any number of doors and move data storage media within the frames of these opened doors, a scan operation must occur to determine which, if any, data storage media have been added, removed, or moved within such frames. Since the location of data storage media within such a library are not known with certainty, any host requests to mount or demount data storage media are held until an inventory update procedure has completed. However, the inventory update procedure is a time consuming process that currently holds all mount/demount activity in the library while it's in process. Further, the time increases as the length of the library increases. In order to mitigate the problem wherein all mount/demount activity is held while the inventory update procedure is in progress, the present invention provides a mechanism wherein some mount/demount activity can occur while the inventory update is in progress, and, as the inventory update progresses, allows a corresponding increase in the number of data storage media that are available for mount/demount during the inventory update.

Figure 3:
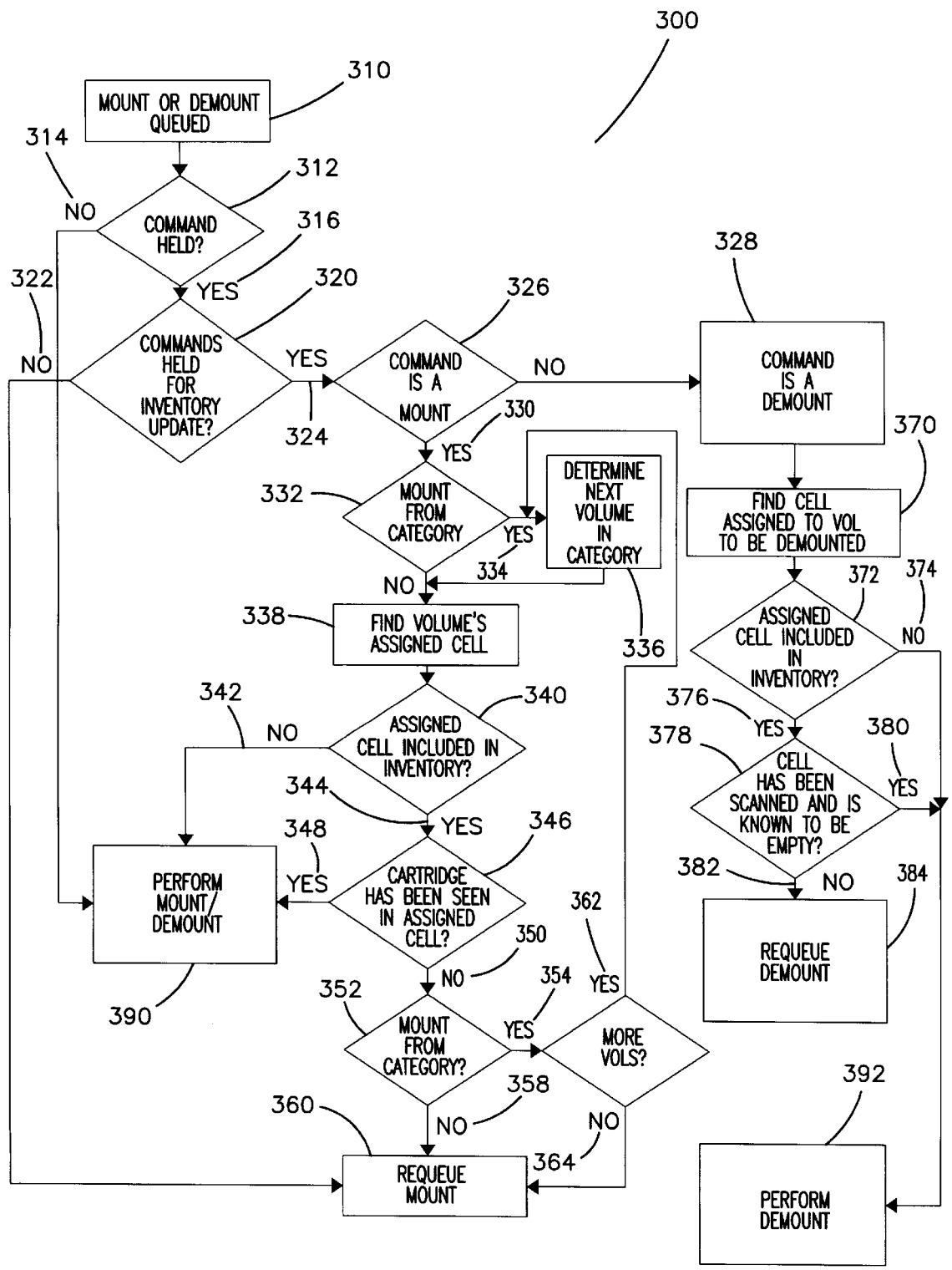
FIG. 3 illustrates a flow chart of the method for facilitating progressive increase in allowable mount/demounts during inventory updates.

FIG. 3 illustrates a flow chart 300 of the method for facilitating progressive increase in allowable mount/demounts during inventory updates. First, a mount or demount request is queued 310. Then, the system determines whether commands are being held 312. If commands are not held 314, the system performs the queued mount or demount request 390. If commands are being held 316, the system then determines whether commands are held for inventory update 320. If commands are not being held for inventory update 322, the system requeues the command 360. In the alternative 324, the system determines if the command is a mount 326 or a demount command 328.

If the command is a mount 330, the system determines whether the mount is a mount from category 332. If the mount is a mount from category 334, the system determines the next specific volume in the category 336. Thereafter, the system finds the volume's assigned cell 338.

Once the volume's assigned cell is located, the system determines whether the assigned cell is included in the inventory 340. If the assigned cell is not included in the inventory 342, the system performs the queued mount or demount 390. If the assigned cell is included in the inventory 344, the system determines whether the cartridge has been seen in the assigned cell 346. If the cartridge has been seen in the assigned cell 348, the system performs the queued mount or demount 390. If the cartridge has not been seen in the assigned cell 350, the system determines if a category mount whether there is another cartridge in category that could be mounted 352. If the mount is a category mount 354, the system loops back to determine the next volume in the category 336 if there are more volumes 362. If no more volumes 364, the mount is requeued 360. If the mount is not a category mount 358, the mount is requeued 360.

When the command is determined to be a demount 328, the cell assigned to the volume to be demounted is located 370. Then, the system determines whether the assigned cell is included in the inventory 372. If the assigned cell is not included in the inventory 374, the demount is performed 392. If the assigned cell is included in the inventory 376, the system determines whether the cell has been scanned and determined to be empty 378. If the cell has been scanned and determined to be empty 380, the demount is performed 392. If it is not the case that the cell has been scanned and determined to be empty 382, the demount command is requeued 384.

Figure 4:
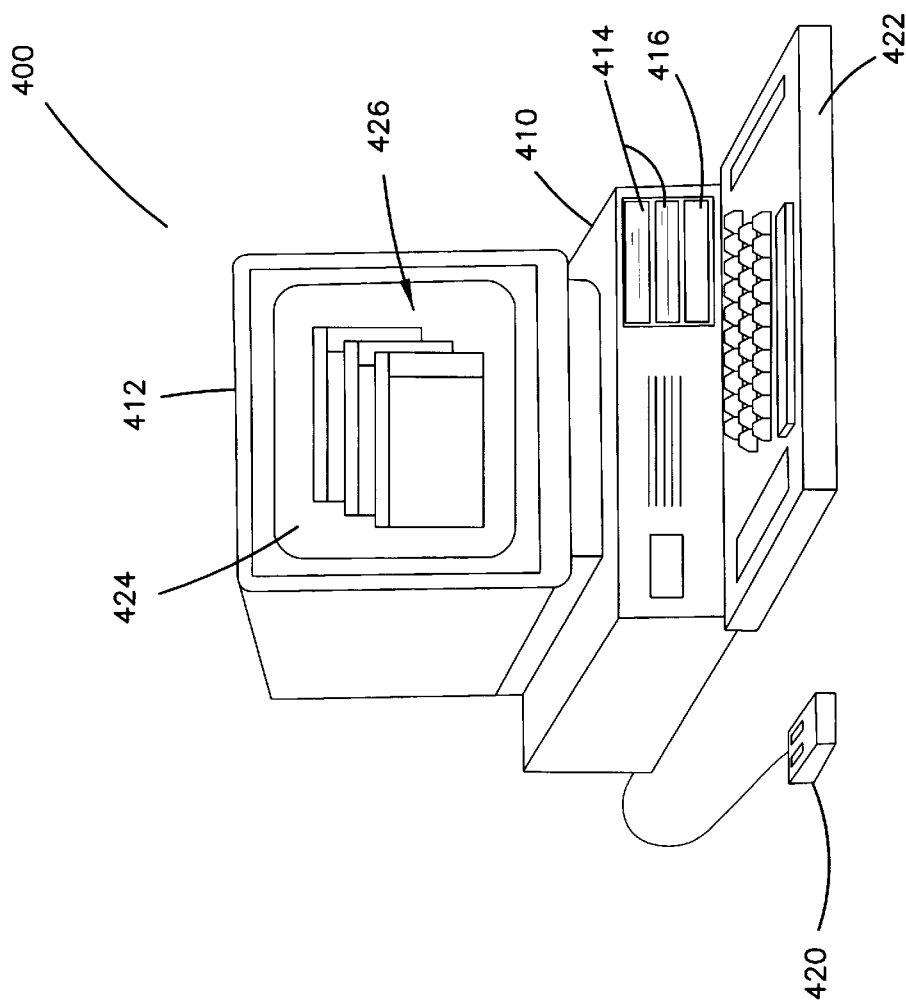
FIG. 4 is a block diagram that illustrates an exemplary hardware environment for managing inventory updates in a data storage media library according to the present invention.

FIG. 4 is a block diagram 400 that illustrates an exemplary hardware environment for managing inventory updates in a data storage media library according to the present invention. The present invention is typically implemented using a computer 410 comprised of a microprocessor, random access memory (RAM), read-only memory (ROM), and other components. It is envisioned that attached to the computer 410 may be a monitor 412, floppy disk drives 414, and CD-ROM drives 416. Also included in the preferred embodiment may be input devices, for example, a mouse pointing device 420 and a keyboard 422.

The computer 410 operates under the control of an operating system 424, such as the Windows, OS/2, Macintosh, or UNIX operating systems, which is represented in FIG. 4 by the screen display on the monitor 412. The computer 410 executes one or more computer programs 426, which are represented in FIG. 4 by the "windows" displayed on the monitor 412, under the control of the operating system 424. The present invention comprises a data storage media dataserver that is preferably implemented in the operating system 424 and/or computer programs 426.

Generally, the operating system 424 and the computer programs 426 may be tangibly embodied in a computer-readable medium or carrier, e.g. one or more of the fixed and/or removable data storage devices 414 and 416, or other data storage or data communications devices. Both the operating system 424 and the computer programs 426 may be loaded from the data storage devices 414 and 416 into the random access memory of the computer 410 for execution by the microprocessor as discussed above with reference to FIG. 3. Both the operating system 424 and the computer programs 426 comprise instructions which, when read and executed by the microprocessor of the computer 410, causes the computer 410 to perform the steps necessary to execute the steps or elements of the present invention.

Although an exemplary computer system configuration is illustrated in FIG. 4, those skilled in the art will recognize that any number of different configurations performing similar functions may be used in accordance with the present invention.

In summary, all data storage media behind opened doors in the library will be scanned. Any cartridge in a cell within a frame that did not have its door opened, and hence will not be inventoried, will be marked as verified. Any host mount or demount requests will then be examined to see if the request is for a verified cartridge. In the event that it is, the mount/demount will be allowed to proceed, even as the inventory update continues to progress.

For any frames having had a door opened, and hence requiring that they be inventoried, data storage media in the cells of such frames will initially be marked as not verified. This is because they may have been removed from the library or moved within the library. As the inventory update progresses through, columns of cells are scanned and as a result, data storage media within those cells, as identified by their volume serial numbers, become verified and available to satisfy mount/demount requests. So, as the inventory update proceeds towards completion, the number of mount/demount requests that can be satisfied proceeds to the entire set of data storage media.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for managing inventory updates in a data storage media library, comprising the steps of:

initiating an inventory update for the a data storage media library;

scanning data storage media in the data storage media library;

identifying verified data storage media;

receiving a request for moving data storage media between a rack and data storage media drives;

determining if the request is for verified data storage media;

performing the request when the request is determined to be for verified data storage media; and requeueing the request when the request is for unverified data storage media.

2. The method of claim 1 wherein the step of identifying verified data storage media further comprises the step of determining whether a frame containing data storage media has had a door to the frame opened and designating the data storage media in a frame having had the door opened as being unverified.

3. The method of claim 2 wherein the step of identifying verified data storage media further comprises the step of determining whether a frame containing data storage media has had a door to the frame opened and designating the data storage media in a frame not having had the door opened as being verified.

4. The method of claim 1 wherein the request is a mount request, a data storage media being associated with the mount request.

5. The method of claim wherein the step of determining if the request is for verified data storage media further comprises the steps of:

determining whether the mount is a category mount;

ascertaining the next volume in the category when the mount is from a category;

locating an assigned cell of the volume;

resolving whether the assigned cell is included in the inventory; and performing the mount request when the assigned cell is not included in the inventory.

6. The method of claim 5 further comprising the step of deciding whether the data storage media has been seen in the assigned cell when the assigned cell is included in the inventory.

7. The method of claim 6 further comprising the step of performing the mount request when the data storage media has been seen in the assigned cell.

8. The method of claim 6 further comprising the step of determining whether the data storage media associated with the mount request is from a category when the data storage media has not been seen in the assigned cell.

9. The method of claim 8 further comprising the step of determining a next volume in the category if the data storage media associated with the mount request is from a category mount.

10. The method of claim 8 further comprising the step of designating the data storage media associated with the mount request as being unverified when the data storage media has not been seen in the assigned cell.

11. The method of claim 1 wherein the request is a demount request, a data storage media being associated with the demount request.

12. The method of claim 11 wherein the step of determining if the request is for verified data storage media further comprises the step of locating a cell assigned to a volume containing the data storage media associated with the demount request.

13. The method of claim 12 further comprising the step of establishing whether the assigned cell is included in the inventory.

14. The method of claim 13 further comprising the step of performing the demount request when the assigned cell is not included in the inventory.

15. The method of claim 13 further comprising the steps of determining whether the cell has been scanned and determined to be empty when the assigned cell is included in the inventory.

16. The method of claim 15 further comprising the step of designating the data storage media associated with the demount request as being verified when the cell has been scanned and determined to be empty.

17. The method of claim 15 further comprising the step of designating the data storage media associated with the demount request as being unverified when the cell has been scanned and determined not to be empty.

18. The method of claim 1 wherein the step of initiating the inventory update further comprises updating a number of unverified cartridges and frames to increase the number of verified cartridges and frames after initiating the inventory update, the increase in the number of verified cartridges and frames increasing the likelihood of satisfying a request.

19. The data storage media dataserver, comprising:
a data storage media Library including data storage media;
data storage drives;
an accessor for accessing accesses the data storage media from storage slots in the data storage media library and delivering the accessed media to the data storage drives; and
a library manager, the library manager initiating an inventory update for the data storage media library, scanning data storage media in the data storage media library, identifying verified data storage media, receiving a request for moving data storage media between the slots and the data storage drives, determining the request is for verified data storage media performing the request when the request is determined to be for verified data storage media and requeueing the request when the request is for unverified data storage media.

20. The dataserver of claim 19 wherein the library manager identifies verified data storage media by determining whether a frame containing data storage media has had a door to the frame opened and designating the data storage media in a frame having had the door opened as being unverified.

21. The dataserver of claim 20 wherein the library manager designates the data storage media in a frame not having had the door opened as being verified.

22. The dataserver of claim 9 wherein the library manager updates a number of unverified cartridges and frames to increase the number of verified cartridges and frames after initiating the inventory update, the increase in the number of verified cartridges and frames increasing the likelihood of satisfying a request.

23. An article of manufacture or computer-based user-interface, the article of manufacture comprising a computer readable medium hanging instructions for causing a computer to perform and manage inventory updates in a data storage media library, the method comprising the steps of:

initiating an inventory update for the a data storage media library;
scanning data storage media in the data storage media library;
identifying verified data storage media;
receiving a request for moving data storage media between a rack and data storage media drives;
determining if the request is for verified data storage media; performing the request when the request is determined to be for verified data storage media; and
requeueing the request when the request is for unverified data storage media.

24. The article of manufacture of claim 23 wherein the step of identifying verified data storage media further comprises the step of determining whether a frame containing data storage media has had a door to the frame opened and designating the data storage media in a frame having had the door opened as being unverified.

25. The article of manufacture of claim 24 wherein the step of identifying verified data storage media further comprises the step of determining whether a frame containing data storage media has had a door to the frame opened and designating the data storage media in a frame not having had the door opened as being verified.

26. The article of manufacture of claim 23 wherein the request is a mount request, a data storage media being associated with the mount request.

27. The article of manufacture of claim 26 wherein the step of determining if the request is for verified data storage media further comprises the steps of:
determining whether the mount is a category mount;
ascertaining the next volume in the category when the mount is from a category;
locating an assigned cell of the volume;
resolving whether the assigned cell is included in the inventory; and
performing the mount request when the assigned cell is not included in the inventory.

28. The article of manufacture of claim 27 further comprising the step of deciding whether the data storage media has been seen in the assigned cell when the assigned cell is included in the inventory.

29. The article of manufacture of claim 28 further comprising the step of performing the mount request when the data storage media has been seen in the assigned cell.

30. The article of manufacture of claim 28 further comprising the step of determining whether the data storage media associated with the mount request is from a category when the data storage media has not been seen in the assigned cell.

31. The article of manufacture of claim 30 further comprising the step of determining a next volume in the category if the data storage media associated with the mount request is from a category mount.

32. The article of manufacture of claim 30 further comprising the step of designating the data storage media associated with the mount request as being unverified when the data storage media has not been seen in the assigned cell.

33. The article of manufacture of claim 23 wherein the request is a demount request, a data storage media being associated with the demount request.

34. The article of manufacture of claim 33 wherein the step of determining if the request is for verified data storage media further comprises the step of locating a cell assigned to a volume containing the data storage media associated with the demount request.

35. The article of manufacture of claim 34 further comprising the step of establishing whether the assigned cell is included in the inventory.

36. The article of manufacture of claim 35 further comprising the step of performing the demount request when the assigned cell is not included in the inventory.

37. The article of manufacture of claim 35 further comprising the steps of determining whether the cell has been scanned and determined to be empty when the assigned cell is included in the inventory.

38. The article of manufacture of claim 37 further comprising the step of designating the data storage media associated with the demount request as being verified when the cell has been scanned and determined to be empty.

39. The article of manufacture of claim 37 further comprising the step of designating the data storage media associated with the demount request as being unverified when the cell has been scanned and determined not to be empty.

40. The article of manufacture of claim 23 wherein the step of initiating the inventory update further comprises updating a number of unverified cartridges and frames to increase the number of verified cartridges and frames after initiating the inventory update, the increase in the number of verified cartridges and frames increasing the likelihood of satisfying a request.

41. A method for managing inventory updates in a data storage media library, comprising:

providing a library containing verified data storage media;

experiencing an event that causes at least one verified data storage media to become an unverified data storage media; and performing an inventory update for unverified storage media while allowing verified storage media to be available requests for moving data storage media between a rack and data storage media drives, wherein the inventory update converts unverified data storage media to verified data storage media, the converted verified data storage media becoming available for the requests during the inventory update.

42. The data storage media dataserver, comprising:

a data storage media library including data storage media;

data storage drives;

an accessor for accessing accesses the data storage media from storage slots in the data storage media library and delivering the accessed media to the data storage drives; and a library manager, the library manager providing a library containing verified data storage media, experiencing an event that causes at least one verified data storage media to become an unverified data storage media and performing an inventory update for unverified storage media while allowing verified storage media to be available requests for moving data storage media between a rack and data storage media drives; wherein the inventory update converts unverified data storage media to verified data storage media, the converted verified data storage media becoming available for the requests during the inventory update.

43. An article of manufacture or computer-based user-interface, the article of manufacture comprising a computer readable medium hanging instructions for causing a computer to perform and manage inventory updates in a data storage media library, the method comprising:

providing a library containing verified data storage media;

experiencing an event that causes at least one verified data storage media to become an unverified data storage media; and performing an inventory update for unverified storage media while allowing verified storage media to be available requests for moving data storage media between a rack and data storage media drives, wherein the inventory update converts unverified data storage media to verified data storage media, the converted verified data storage media becoming available for the requests during the inventory update.

* * * * *

UNITED STATES PATENT AND TRADEMARK OFFICE
CERTIFICATE OF CORRECTION

PATENT NO. : 6,014,675

DATED : January 11, 2000

INVENTOR(S) : Brewer et al.

It is certified that error appears in the above-identified patent and that said Letters Patent are hereby corrected as shown below:

Column 9, line 57, change "claim 9" to -- claim 19 --
Column 1, line 46, change "IBM 3590tape" to -- IBM 3590 tape --
Column 3, line 11, Insert "." after "media"
Column 3, line 11, Insert new paragraph at "Another aspect..."
Column 6, line 10, Insert new paragraph at "However,..."

Signed and Sealed this

Tenth Day of April, 2001

*Attest:*

NICHOLAS P. GODICI

*Attesting Officer*   *Acting Director of the United States Patent and Trademark Office*